United States Patent Office 3,365,367
Patented Jan. 23, 1968

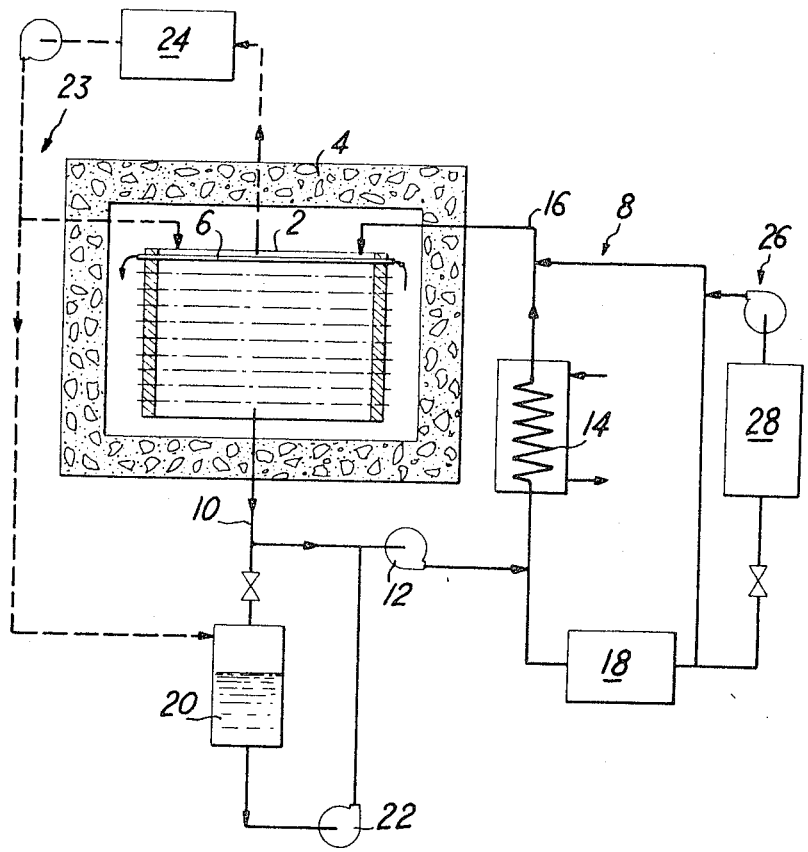

3,365,367
COMPENSATING FOR REACTIVITY CHANGES IN LIQUID-MODERATED NUCLEAR REACTORS
Lucien Dolle, Palaiseau, France, assignor to Commissariat à l'Energie Atomique, Paris, France
Filed Sept. 26, 1966, Ser. No. 581,789
Claims priority, application France, Oct. 13, 1965, 34,868
5 Claims. (Cl. 176—22)

ABSTRACT OF THE DISCLOSURE

Reactivity changes in a liquid moderated nuclear reactor are compensated by dissolving two different neutron poisons as contained in lithium tetraborate in the heavy water. The heavy water is continuously purified by a mixed bed of weak anionic resins and cationic resins for removal of lithium compensating for fast reactivity decrease and the boron is removed by a bed of strong anionic resins over a time interval depending on the rate of slow reactivity decrease.

---

The present invention is directed to a method of compensating for variations in reactivity of a liquid-moderated nuclear reactor during operation, said method being especially applicable to heavy-water moderated reactors.

From the time they attain criticality with new fuel elements, nuclear reactors are subjected during their working cycle to a progressive decrease in reactivity as a result of a number of different phenomena. Some phenomena (such as, in particular, xenon poisoning) result in fast reactivity decrease to a level stage which is reached after a few days whilst other phenomena (samarium poisoning and reduction in the proportion of fissile nuclei contained in the fuel) result in a slow reactivity decrease throughout the cycle of utilization of the fuel load.

In power reactors of the liquid moderator and/or liquid coolant type, one method which is frequently employed in order to compensate for reactivity decrease consists in adding "burnable" neutron poisons to the moderator and/or to the coolant. In reactors which utilize either boiling or pressurized light water as moderator and coolant, this poison is usually constituted by boron in solution in the form of boric acid. Part of the boron progressively disappears as a result of neutron absorption, thus partly compensating for slow changes in reactivity. In order to compensate for fast changes, part of the water containing boric acid in solution can be drawn off and replaced by pure water.

This expedient cannot readily be applied to reactors which are moderated by heavy water. In fact, the boron in the form of boric acid is fixed only by the strong anionic resins and the equilibrium constant of the exchange reaction is low; moreover, there is obviously no question of wasting a fraction of the heavy water in view of its high cost price. On the other hand, boron can serve to compensate for samarium poisoning and fuel burn-up which require its presence in controlled concentration over a period of several weeks and consequently call for very slow removal.

Consideration has been given to the possibility of replacing boron by other elements which have a high neutron capture cross-section, such as in particular, cadmium sulphate, but the use of his element also presents a certain number of problems.

It has also been proposed to make use of other poisons and in particular the lithium isotope (6). Lithium can be completely removed from the moderator without difficulty and is most suitable for the purpose of compensating for the fast initial decrease of reactivity which results in particular from xenon poisoning. However, a disadvantage is that any compensation for reactivity changes on a long time-scale would not be possible inasmuch as the lithium is fixed by the strong cationic resins which are employed for the continuous purification of the moderator by ion exchange within an auxiliary circuit; the lithium concentration therefore decreases at a high rate since purification of the moderator cannot be suppressed and it would prove too costly to restore the poison concentration by repeated additions of the poison.

Finally, the use as neutron poisons in solution of definite chemical compounds (such as the lithium and boron compounds) of two elements which have a high neutron capture cross-section has been contemplated in theoretical studies of all the poisons which are suitable for use; with elimination of these poisons in the purification or decontamination systems which are always associated with moderator circuits.

This invention is directed to the design concept of a method of compensation for fast and slow reactivity changes which satisfies practical needs to a greater extent than has been permitted heretofore by methods of the prior art, especially insofar as it provides successive compensation for the two reactivity-decrease effects while at the same time offering the possibility of carrying out the purification of the moderator by ion exchange (in the case of heavy water) on a mixed bed of strong cationic resins and weak anionic resins without thereby impairing the concentration of the boron which is present in solution.

To this end, the invention proposes a method of compensation for reactivity changes in a heavy-water moderated reactor which consists in dissolving two different neutron poisons in heavy water and in removing one of said poisons by the process of continuous purification of the moderator, characterized by the slow elimination of the other poison—which remains in solution when it is subjected to this process—by a separate process and at a rate which is regulated in dependence on the long-term effects which tend to reduce reactivity such as samarium poisoning and fuel burn-up.

In a preferred mode of execution of the invention, both poisons are associated in a same definite soluble chemical compound and one of said poisons is removed by the purification circuit whilst the other poison is converted to a new soluble form. In this manner, compensation for fast reactivity decrease resulting from xenon poisoning takes place as if this latter were alone present by selectively eliminating one of the poisons (on ion exchange resins, for example) over a time interval which is varied as a function of xenon build-up in the reactor, whereas compensation for slow reactivity decrease (resulting from samarium poisoning and fission of nuclei) is effected by means of the second poison which is maintained in solution and removed (on ion exchange resins, for example) over a time interval which is varied in dependence on the rate of said slow reactivity decrease.

When the definite chemical compound is lithium tetraborate $Li_2B_4O_7 \cdot 5H_2O$, the utilization in the purification circuit of a mixed bed of weak anionic resins and strong catonic resins makes it possible to fix the lithium and to prevent the fixaton of the boron which would be fixed only by strong anionic resins and which is again present in solution in the form of boric acid.

One specific example of execution of the invention will now be described without implied limitation. The description relates to the single accompanying figure which shows diagrammatically the moderator circuit of a nuclear reactor which is moderated by heavy water and cooled by circulation of a gaseous coolant (carbon dioxide gas, for example).

The nuclear reactor which is illustrated in the figure comprises a tank 2 for containing heavy water and disposed within a biological shield structure or containment vessel 4. The tank is traversed by a group of parallel pressure tubes disposed on a uniform lattice, only one pressure tube 6 being shown for greater clarity. Said pressure tubes contain the fuel elements and form part of a coolant circuit which is not shown in the figure and through which the coolant is circulated (usually $CO_2$ or $H_2O$).

There is associated with the tank 2 a circuit 8 for the continuous cooling and purification of heavy water. Said circuit 8 comprises successively a duct 10 for the withdrawal of heavy water, a circulating pump 12, a heat exchanger 14 and a duct 16 for returning the heavy water to the tank; by-pass system, through which is circulated part of the water which flows through the circuit 8, comprises a demineralizer 18, the active element of which is constituted by a mixed bed of ion exchange resins for the purpose of fixing the corrosion products and other impurities which are introduced accidentally into the reactor or which are formed by radiolytic reaction.

Provision is also made for a storage circuit comprising a storage tank 20 and a re-injection pump 22, as well as for a recombination circuit 23 for the deuterium and the oxygen which are derived from the decomposition of the heavy water. This circuit, which is shown in broken lines in the figures, withdraws the gases from the top of the tank 2 and returns the reconstituted heavy water to the storage tank 20 and to the reactor tank after recombination in a catalytic element 24.

The circuit which has been described thus far is commonly employed in reactors which are moderated by heavy water and cooled by circulating carbon dioxide gas within pressure tubes containing the fuel elements. In accordance with the present invention, two elements which constitute neutron poisons having different properties are dispersed in the heavy water before the reactor attains criticality with fresh fuel elements. These poisons advantageously consist of boron and lithium which may be enriched with their isotopes 6 of lithium and 10 of boron in a suitable concentration.

The lithium and boron are advantageously employed in combination in the form of lithium tetraborate which is introduced in a form in which it is stripped of its crystal water so as to prevent any possible contamination of the heavy water; the demineralizer 18 is in this case made up of a mixed bed of strong cationic exchange resins and either strongly basic or medium-basic anionic exchange resins.

During the initial stage of operation of the reactor which corresponds to the increase in xenon concentration to a stage which is reached after a few days in the case of a power reactor, the lithium-6 is eliminated by fixation on the exchange resins of the purification unit 18. The lithium and in particular the lithium-6 is fixed by the strong cationic resins of the demineralizer at a rate which can be varied by regulating the flow rate through the demineralizer 18, use being made of a mixed bed of strong cationic resins and weak anionic resins; all of the corrosion products and impurities will be fixed on the resins with the lithium whilst the boron will remain in solution in the heavy water in the form of boric acid. The xenon poisoning effect can thus be readily compensated and the lithium can then be recovered by elution of the resins and directly recycled, which contributes to a reduction in operating expenditure. Once the xenon-135 equilibrium is attained, the normal continuous purification of heavy water is then carried on with a mixed bed of strong cationic resins and weak anionic resins which exchange all of the corrosion products and other impurities; this operation does not modify the boric acid concentration.

The variation in concentration of the boron which is necessary in order to compensate for samarium poisoning and fuel burn-up must extend over a time interval of the order of one month and conforms substantially to an exponential law. Part of the decrease in boron concentration results from burn-up but there does remain an excess poison load. In accordance with the invention, a fixation on strongly basic ion exchange resins is superimposed on the removal of boron resulting from burn-up. This absorption takes place in circuit 26 which takes a fraction of the exit heavy water from the demineralizer 18 and returns it after boron fixation into a purification unit 28.

By way of indication, the compensation for reactivity changes resulting from xenon poisoning during start-up of a power reactor having a thermal neutron flux in the range $5 \times 10^{13}$ to $10^{14}$ neutrons per square centimeter and per second can be performed by circulating through the purification unit 18 an hourly flow of heavy water which corresponds to a fraction varying between 9 and 10% of the total volume of heavy water contained in the reactor tank. Again in the case of a neutron flux within the range of $5 \times 10^{13}$ to $10^{14}$ neutrons per square centimeter and per second, the boron burn-up rate, while high, does not make it possible to obtain the desired reactivity compensation. The excess poison load varies approximately between 12 and 35% of the initial value of reactivity control produced by the added boron (this approximation does not take into account the residence time of a fraction of the poisoned heavy water in that portion of the heavy water circuit which is located outside the neutron flux). In order to provide satisfactory compensation, the ratio of the hourly flow to be circulated within circuit 26 to the total volume of heavy water is usually within the range of 0.0016 to 0.002 in the case of the neutron flux values indicated above.

There can be employed in the demineralizer 18 a mixture of resins designated by the trademarks "Lewatit s 100" (strong cationic resin) and "Lewtit MP 60" (medium-basic anionic resin). The strongly basic anionic resin which is placed in the purification unit 28 can be the resin which is designated by the trademark "Lewatit M 500."

The lithium tetraborate could be replaced by a mixture of lithium sulphate and deuterated boric acid, but this method of operation would be disadvantageous compared with the method hereinabove described, inasmuch as the subsequent removal of the sulphate ion from the heavy water would entail an additional consumption of anionic resin. The use of a definite compound thus has appreciable advantages.

In short, it is apparent that the invention offers a method of compensation for xenon poisoning by means of a first poison and for samarium poisoning and fuel burn-up by means of another poison, whereby normal purification of heavy water may be carried on without entailing any need to re-inject the poison, and whereby an economy of ion exchange resins is achieved by virtue of the possibility of employing a cationic resin alone for the purpose of removing lithium-6, with the result that this resin can be regenerated while the lithium-6 is recovered by elution and at the same time.

The invention is evidently not limited to the modes of execution which have been described in the foregoing by way of example and it must be understood that the scope of this patent extends to all alternative forms.

What I claim is:

1. A method of compensation for reactivity changes in a liquid-moderated nuclear reactor, comprising the steps of dissolving two different neutron poisons in the moderator, of removing one of the poisons by the process of continuous purification of the moderator, and of slow removal of the other poison—which remains in solution when it is subjected to said process—at a rate which is regulated as a function of the long-term effects which produce a decrease in reactivity.

2. A method in accordance with claim 1, wherein the two poisons are combined in the form of a definite chamical compound which is soluble in the moderator, that poison which cannot be removed by the process of purification of the moderator being of such nature that it gives rise to a new soluble compound when the other poison is removed.

3. A method in accordance with claim 1 or claim 2, wherein the moderator is heavy water and said definite compound is lithium tetraborate.

4. A method in accordance with claim 3, wherein the process of continuous purification is carried out by passing heavy water through a mixed bed of weak anionic resins and cationic resins and in which said separate process is carried out by passing heavy water through a bed of strong anionic resin.

5. A system for compensating for reactivity changes in a nuclear reactor of the type comprising a tank for containing a liquid moderatior and a circuit for the continuous purification of the moderator and the fixation of a first poison in solution in the moderator which is circulated through said circuit at a predetermined flow rate, said system comprising an auxiliary reactivity-compensation circuit through which is circulated a variable flow of moderator and which comprises an exchanger for fixing a second poison which cannot be removed by said continuous-purification circuit.

References Cited

UNITED STATES PATENTS

| | | | |
|---|---|---|---|
| 2,989,454 | 6/1961 | Breden et al. | 176—37 |
| 3,222,254 | 12/1965 | Maldague et al. | 176—37 |
| 3,310,473 | 3/1967 | Winsche | 176—22 |

L. DEWAYNE RUTLEDGE, *Primary Examiner.*

H. E. BEHREND, *Assistant Examiner.*